United States Patent [19]
Peterson

[11] Patent Number: 5,259,185
[45] Date of Patent: Nov. 9, 1993

[54] FUEL DRAINAGE CONNECTOR SYSTEM FOR AIRCRAFT GAS TURBINE

[75] Inventor: Ivan H. Peterson, Hamilton, Ohio

[73] Assignee: General Electric Company, Cincinnati, Ohio

[21] Appl. No.: 894,673

[22] Filed: Jun. 5, 1992

[51] Int. Cl.⁵ .................................................. F02C 7/22
[52] U.S. Cl. .................................. 60/39.094; 60/739; 285/14
[58] Field of Search ................ 60/39.094, 734, 739; 285/13, 14, 401, 402, 360, 376

[56] References Cited

U.S. PATENT DOCUMENTS

| | | | |
|---|---|---|---|
| 2,684,860 | 7/1954 | Rafferty | 285/376 |
| 2,690,648 | 10/1954 | Pearce et al. | 60/39.74 |
| 2,846,845 | 8/1958 | Parker | 60/39.09 |
| 2,881,827 | 4/1959 | Roche et al. | 60/39.094 |
| 3,645,562 | 2/1972 | Fandetti et al. | 285/360 |
| 3,858,910 | 1/1975 | Oetiker | 285/376 |
| 4,467,610 | 8/1984 | Pearson et al. | 285/13 |
| 4,708,371 | 11/1987 | Elsworth et al. | 285/13 |
| 4,960,153 | 10/1990 | Bergsma | 137/587 |

Primary Examiner—Louis J. Casaregola
Attorney, Agent, or Firm—Jerome C. Squillaro; John R. Rafter

[57] ABSTRACT

A fuel drain can assembly positioned between the fuel manifold and the fuel nozzles of a gas turbine engine which utilizes detachable connectors rotatable into locking engagement without special tooling.

4 Claims, 3 Drawing Sheets

FUEL DRAINAGE CONNECTOR SYSTEM FOR AIRCRAFT GAS TURBINE

BACKGROUND OF THE INVENTION

This invention relates to a detachable drain system for the multiple fuel segments which provide fuel to fuel nozzles projecting into an aircraft gas turbine combustion chamber.

Unburnt fuel drainage is of vital importance when aircraft gas turbines are shut down, either after a period of operation or where the starting cycle is not completed because combustion did not begin. Combustion chamber drain arrangements are shown, for example, in U.S. Pat. No. 2,846,845, issued Aug. 12, 1958 and assigned to the same assignee as the present invention. A typical fuel drain manifold system may include multiple connectors which employ nuts with lockwires, requiring special tools to install and remove with such operations being relatively difficult and time consuming. It is important to prevent fuel in the fuel supply lines from leaking through the nozzles into the combustion chamber when the gas turbine is shut down because of the tendency for the fuel inlets to clog due to the carbonization of the fuel as it issues slowly from the heated nozzles. Furthermore, fuel drainage prior to the combustion chambers reduces the danger of flaming which exists when unburned fuel is present in quantity in the combustion chamber. Accordingly, the leakage of fuel either from unburnt fuel or from a leak at a joint in the fuel system in the "hot section" or fire zone of the engine should be prevented or contained.

However, there may be thirty or more fuel nozzles supplied from a typical fuel manifold such that the proper installation and detachment of the fuel drain lines to the drain manifold typically requires special tooling, considerable time., and skill. Moreover, the multiple spaced nozzles and fuel segment lines increase the difficulty in properly positioning and connecting, or disconnecting, the system.

OBJECTS AND SUMMARY OF INVENTION

Accordingly, it is an object of this invention to provide an improved fuel supply drain manifold system for an aircraft gas turbine engine which is simple in construction and which can be readily installed and detached.

Another object of this invention is to provide an improved fuel drain manifold system which requires no special tools to install or detach.

A further object of this invention is to provide an improved fuel drain manifold system which facilitates the proper positioning and securing of the manifold system on the aircraft gas turbine and prevention or containment of fuel leakage in the region of the turbine fire zone.

These and other objects of the invention will become more apparent by reference to the following description taken in conjunction with the accompanying drawings. In order to attain the above and other related objectives, in carrying out the present invention in one form thereof, the fuel manifold drain cans on an aircraft gas turbine include connector assemblies having a first connector with a pair of diametrically opposed and radially inwardly extending fingers which are integral with the drain shroud which are guided into mating slots in a second connector comprising a locking ring fastened to the fuel nozzle, whereupon the drain shroud is rotated to lock the connectors together. In the locked position, the locking ring is surrounded by an annulus and a resilient washer within the annulus is compressed between a shoulder on the rotatable annulus and an axially facing surface on the locking ring providing a leak-proof seal.

Figure 1:
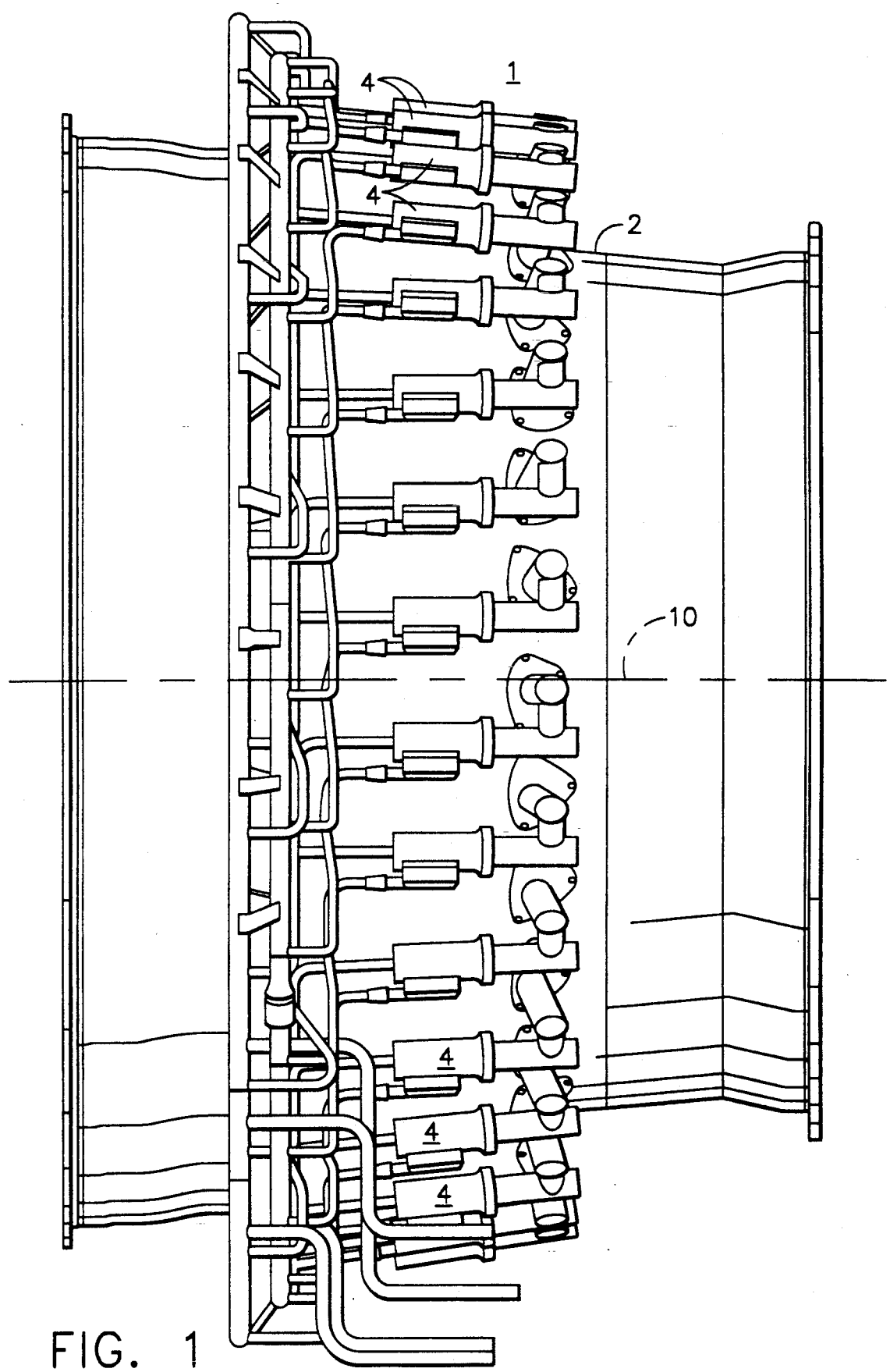
FIG. 1 shows a fuel manifold system for an aircraft gas turbine incorporating the present invention.
Figure 2:
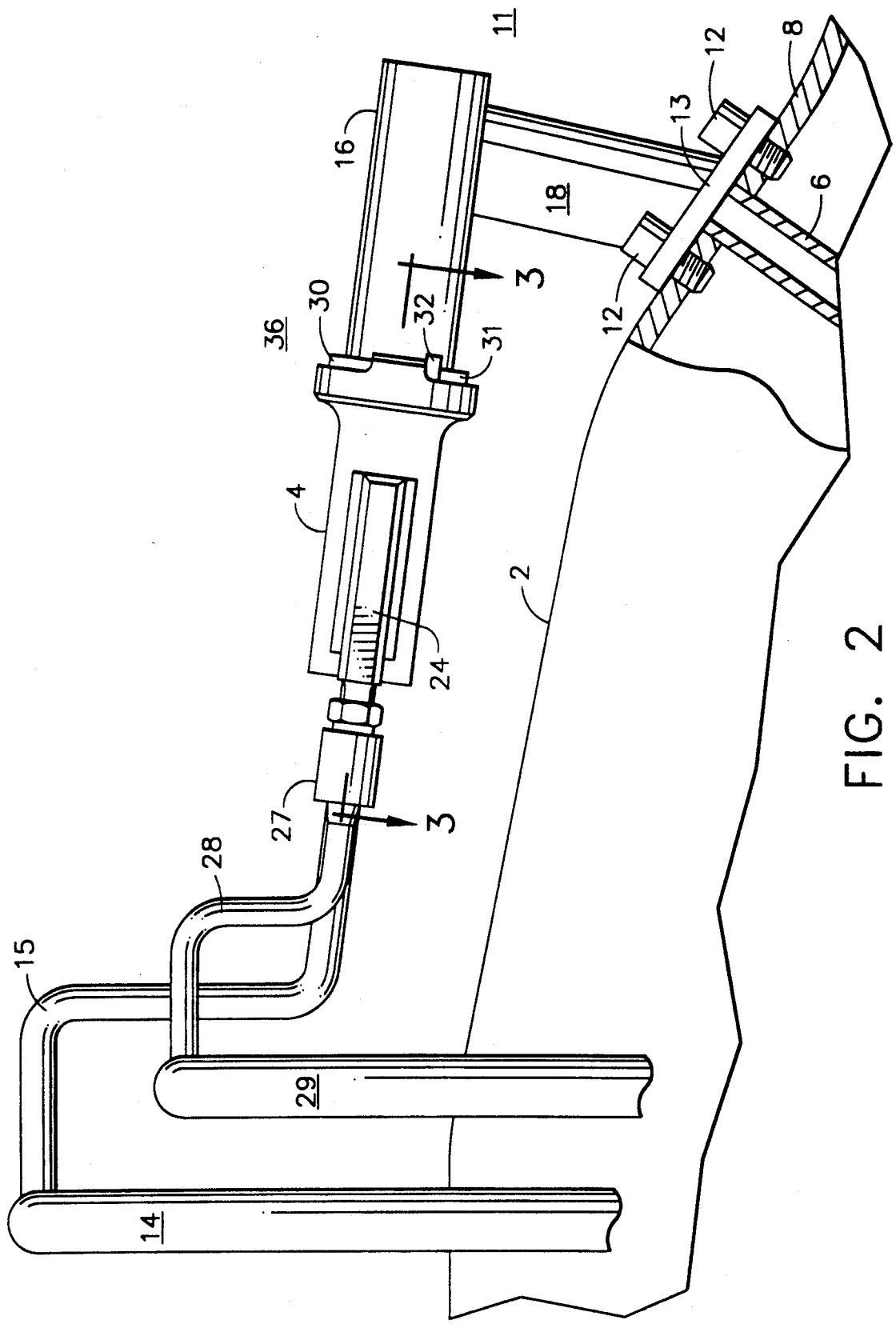
FIG. 2 is an enlarged portion of FIG. 1 showing details of the invention.

Referring first to FIGS. 1 and 2, a fuel manifold 1 surrounding the combustor casing 2 includes a plurality of fuel manifold drain cans such as 4 positioned circumferentially around the combustor casing. In a typical gas turbine engine, thirty or more fuel manifold drain can assemblies 4 may be utilized in connection with an equal number of fuel lines, each of which is associated with a fuel nozzle 6 extending through walls 8 of the combustor casing 2 toward the axis 10 of the combustor casing. Fuel nozzle 6 extends radially inward from the outer wall 8 of the combustor casing 2 to provide the desired fuel spray pattern within the combustor chamber.

Figure 3:
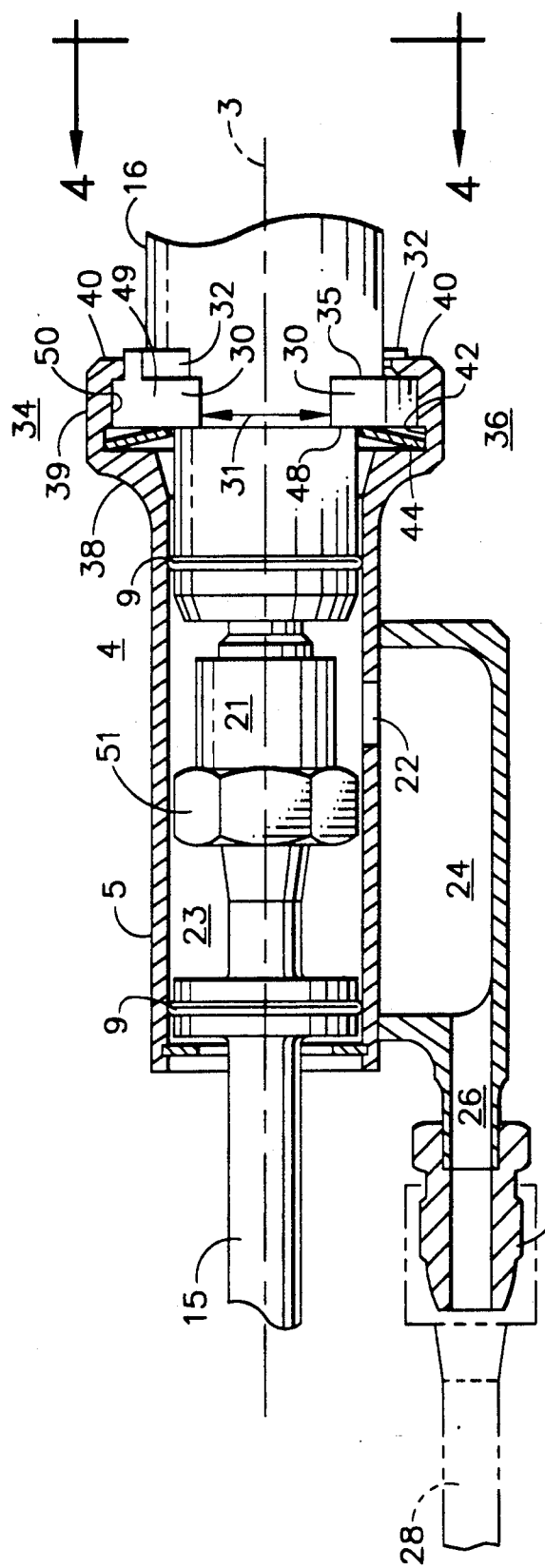
FIG. 3 is a cross section of a portion of FIG. 2 taken in the direction of the arrows 3—3 in FIG. 2.

Fuel line 15 connects through the valve 21 positioned within drain chamber 23 formed within cylindrical drain can 5, and sealed on either side by O-rings 9. Drain hole 22 connects drain chamber 23 of drain can assembly 4 to drain sump 24 positioned below the drain can, as best shown in FIG. 3. The drain sump 24 is connected through drain return 26, connector 27 and drain line 28 to fuel drain manifold 29 to carry the drained fuel away from combustor casing 2.

Figure 4:
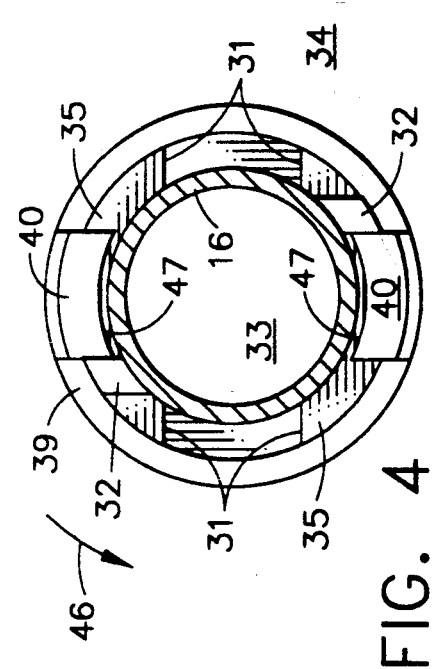
FIG. 4 is a side view in cross section of a portion of FIG. 3 taken in the direction shown by the arrows 4—4 in FIG. 3.

Detachable coupling 36 is best shown in FIGS. 2–4. Referring to FIGS. 2–4, cylindrical drain can 5 includes a cylindrical terminal portion 39 having a diameter greater than that of the cylindrical drain can, connected by neck 38, and including diametrically opposed fingers 40 extending transverse to the cylindrical terminal portion and to axis 3, wherein fingers 40 include a radially inner surface 47 as best seen in FIG. 4.

A flange 30 is secured to tubular pipe 16 which connects through support 18 to fuel nozzle 6. Flange 30 is positioned within terminal cylindrical portion 39 of drain can 5 when detachable coupling 36 is engaged and locked. Flange 30 includes a pair of opposed and substantially parallel axially facing surfaces 35 and 48, and a pair of diametrically opposed and axially extending stops 32 secured to axially facing surface 35. Flange 30 further includes a radially outer surface 49 having a diameter greater than that of radially inner surface 47 of fingers 40 and less than a diameter of a radially inner surface 50 of cylindrical terminal portion 39. Additionally, flange 30 includes a pair of circumferentially extending slots or openings 31, wherein each of the slots 31 extend over an arc length which is greater than an arc length of each of fingers 40, thereby permitting cylindrical terminal portion 39 to be positioned over outer surface 49 of flange 30 by aligning fingers 40 of drain can 5 and slots 31 of flange 30. Axially extending stops 32 are positioned and sized such that, after passing fingers 40 through slots 31 and rotating drain can 5 in the counterclockwise direction as shown by arrow 46 in FIG. 4, each of the stops 32 contacts one of fingers 40. Thus, drain can 5 is rotatable through a limited angle between the stops 32 which are positioned approximately 180° apart and extend over approximately 40° of arc. Flange 13 of support 18 is secured to combustor casing 2 by three bolts 12.

Spring washer 44 is positioned within an annular groove 42 within cylindrical portion 39 adjacent neck 38. Drain can 5 is detachably secured to tubular pipe 16 of fuel nozzle assembly 11 by inserting fingers 40 of drain can 5 through slots 31 of flange 30 and rotating drain can 5 between fingers 40, and rotating the flange in the counterclockwise direction, as shown by arrow 46 in FIG. 4 as noted previously. Rotation of flange 30 is accomplished against the pressure of spring washer 44 which contacts axially facing surface 49 of flange 30 thereby forcing axially facing surface 35 of flange 30 against fingers 40, helping to secure the drain can assembly 4 in position when rotational pressure is removed. However, the use of spring washer 44 is optional.

Drain can assembly 4 thus contains, drains, and removes fuel from the fire zone of the engine including any fuel leakage from joints within the assembly. Drain can assembly 4 can be readily removed from tubular pipe 16 of fuel nozzle assembly 11 by rotation in a direction opposite to that shown by arrow 46, that is, clockwise in FIG. 4, until fingers 40 of drain can 5 are positioned within slots 31 of flange 30, after which drain can 5 can be slid axially away from rotatable flange 30 and tubular pipe 16 of fuel nozzle assembly 11. The drain can 5 may then be slid over O-ring seals 9, exposing the couplinq 51 of valve 21 of fuel nozzle assembly 11.

While the present invention has been described with diametrically opposed fingers 40 35 on drain can assembly 4 and fixed mating slots 31 on fuel nozzle assembly 11, the mating slots and projections could be reversed, that is, slots on the drain can assembly could cooperate with radial extensions on the fuel nozzle assembly to provide a detachable locking arrangement.

While the present invention has been described with respect to certain preferred embodiments thereof, it is to be understood that numerous variations in the details of construction, the arrangement and combination of parts, and the type of material used may be made without departing from the spirit and scope of the invention.

What we claim is:

1. In a gas turbine engine fuel delivery system including a fuel manifold surrounding a combustor connected to a plurality of spaced fuel nozzles positioned inside the combustor, a plurality of detachable fuel connections positioned between the fuel manifold and a fuel nozzle, said detachable fuel connections each comprising:
   a) a fuel line connecting said fuel manifold to one of said fuel nozzles through a fuel passage;
   b) a detachable fuel drain assembly surrounding a portion of said fuel line about an axis thereof;
   c) said fuel drain assembly including a drain can, a drain sump, and a drain passage between said drain can and said drain sump;
   d) a connector for selectively attaching said fuel drain assembly to said fuel line;
   e) said connector including;
      i) a cylindrical terminal portion of said drain can connected to a smaller cylindrical portion of said drain can by a neck;
      ii) a pair of diametrically opposed fingers on said drain can extending radially inward toward said axis and transverse to said cylindrical terminal portion; and
      iii) a flange secured to said fuel line, said flange including a pair of opposed and substantially parallel axially facing surfaces;
   f) wherein said flange includes a pair circumferentially extending slots, each of said slots extending over a first arc length, wherein each of said fingers extend circumferentially over a second arc length, said first arc length being greater than said second arc length such that said fingers of said drain can may pass axially through said slots of said flange thereby allowing said fingers to be subsequently rotated into a locked position of said connector;
   g) wherein said flange includes a radially outer surface which is radially outward of a radially inner surface of said fingers and radially inward of a radially inner surface of said cylindrical terminal portion such that said flange is surrounded by said cylindrical terminal portion and is positioned axially between said neck and said fingers when said connector is in a locked position.

2. The detachable turbine engine fuel drain assembly of claim 1 wherein at least one stop is secured to a first one of said pair of opposed and substantially parallel axially facing surfaces of said flange to limit the rotation of said fingers of said drain can.

3. The detachable turbine engine fuel drain assembly of claim 2 further comprising:
   a) an annular slot within said cylindrical terminal portion of said drain can;
   b) a resilient member positioned in said annular slot, said resilient member being proximate said neck;
   c) said flange positioned between said fingers and said resilient member;
   d) said resilient member contacting a second one of said pair of opposed and substantially parallel surfaces of said flange and pressing said first one of said pair of opposed and substantially parallel surfaces of said flange against said fingers thereby restraining relative axial movement between said detachable fuel drain assembly and said fuel line;
   e) wherein said at least one stop and said resilient member cooperate to restrain the rotation of said detachable fuel drain assembly about said axis.

4. The detachable turbine engine fuel drain assembly of claim 3 wherein said fuel drain assembly further includes resilient O-rings extending between the interior of said drain can and said fuel line to provide an enclosed chamber around said fuel line to limit fuel leakage to said drain passage.

* * * * *